United States Patent [19]

Armstrong et al.

[11] Patent Number: 5,039,878
[45] Date of Patent: Aug. 13, 1991

[54] TEMPERATURE SENSING CIRCUIT

[75] Inventors: Desmond R. Armstrong, Wallington; John B. Hughes, Hove, both of England

[73] Assignee: U.S. Philips Corporation, New York, N.Y.

[21] Appl. No.: 434,759

[22] Filed: Nov. 9, 1989

[30] Foreign Application Priority Data

Nov. 14, 1988 [GB] United Kingdom ................ 8826538

[51] Int. Cl.$^5$ ............................................ H03K 3/295
[52] U.S. Cl. .................................. 307/310; 307/355; 307/491; 323/907
[58] Field of Search .............. 328/3; 357/28; 323/907; 307/310, 491, 355

[56] References Cited

U.S. PATENT DOCUMENTS

| 3,809,929 | 5/1974 | Vihoz | 307/310 |
| 4,475,103 | 10/1984 | Brokaw et al. | 340/501 |
| 4,497,586 | 2/1985 | Nelson | 374/163 |
| 4,733,162 | 3/1988 | Haga et al. | 323/316 |

FOREIGN PATENT DOCUMENTS 3415764 10/1985 Fed. Rep. of Germany.

OTHER PUBLICATIONS

R. C. Jaeger and D. V. Kerns, "Integrated MOS Temperature Sensor", Apr. 13-16, 1980, pp. 161-162, CH 1558-IEEE.

R. C. Jaeger, "Temperature Sensor", Sep. 1979, vol. 22 No. 4, pp. 1346-1347m IBM Technical Disclosure Bulletin.

European Patent Application, 0 344715, Masayuki

Primary Examiner—David Hudspeth
Assistant Examiner—Andrew Sanders
Attorney, Agent, or Firm—Bernard Franzblau

[57] ABSTRACT

In order to sense the temperature of an integrated circuit chip, a semiconductor junction device (D1) integrated on the chip is used to generate a first signal ($V_1$) having a known variation with temperature. A second signal ($V_2$) is generated by passing a PTAT current ($I_2$) through a resistor (R1) so that the second signal ($V_2$) has a known variation with temperature which is opposite in sign to that of the first signal ($V_1$). The two signals are compared (42) to generate an output signal (OT) which is dependent on whether the temperature of the chip is below or above a predetermined threshold temperature. The current ($I_1$) through the junction device (D1) is also PTAT, which provides a more accurate definition of the threshold temperature in terms of integrated circuit parameters.

22 Claims, 2 Drawing Sheets

TEMPERATURE SENSING CIRCUIT

BACKGROUND OF THE INVENTION

This invention relates to a temperature threshold sensing circuit for an integrated circuit which comprises a semiconductor junction device providing a $V_{BE}$ reference and a resistor, a proportional-to-absolute-temperature (PTAT) current generator having a PTAT current source output connected in series with the resistor, the circuit further comprising means for detecting whether the voltage across the resistor exceeds the $V_{BE}$ reference and for generating an output signal which indicates whether the temperature of the integrated circuit is above or below a predetermined threshold temperature.

A circuit of the type set forth in the opening paragraph is known from U.S. Pat. No. 4,733,162. Such a circuit is useful, for example, for providing an over-temperature detection function in a power integrated circuit.

The semiconductor junction device in the circuit known from U.S. Pat. No. 4,733,162 is a bipolar transistor (referenced 29) whose base-emitter junction is connected in parallel with the resistor. The transistor (29) also acts as the detecting means by turning on and drawing a collector current when the PTAT voltage across the resistor exceeds $V_{BE}$. The base current of the transistor in the known circuit detracts from the PTAT current, for which some compensation is provided by a further transistor (30), but the current through the detection transistor (29) is still not well-defined. This introduces uncertainty in $V_{BE}$ and hence also in the threshold temperature.

A further problem with the known circuit is that it requires bipolar transistors in both common emitter and common collector configuration, which may not be available in an integrated circuit when constructed using CMOS technology, for example. The range of device types and configurations available may be further restricted in a high-power integrated circuit because of isolation problems.

SUMMARY OF THE INVENTION

It is an object of the invention to provide an accurate, temperature threshold sensing circuit with improved definition of the threshold temperature.

The invention provides a circuit as set forth in the opening paragraph, characterized in that the PTAT current generator has a further PTAT current source output connected in series with the junction device and the detecting means comprises a voltage comparator for comparing voltage drops across the resistor and the junction device. By relieving the junction device of the detecting function, it is possible to make it a more predictable $V_{BE}$ reference. The logarithmic increase in $V_{BE}$ with temperature caused by the PTAT nature of the current flowing through the junction device will tend to reduce the linear temperature dependence of $V_{BE}$, and hence reduce sensitivity, but it is found that the improved definition of $V_{BE}$ at the critical temperature contributes more to the overall sensitivity. While it might be better in principle to pass a constant current through the junction device, the practical problems of generating an accurate, absolute current reference in an integrated circuit are such that the threshold temperature would in practice be less well-defined.

The semiconductor junction device could be, for example, a simple p-n junction diode. However, the device may also be a bipolar transistor. In one embodiment, the said semiconductor junction device comprises a bipolar transistor connected in common collector configuration having its base terminal connected to a reference voltage source and its emitter connected to one input of the voltage comparator, while the resistor is connected between the said reference voltage source and another input of the comparator. Bipolar transistors in common collector configuration are generally available in MOS integrated circuits whereas floating and common-emitter transistors may not be. While the transistor may be "diode connected" so that the reference voltage source at the base is simply the supply voltage source to which the collector is connected, using a transistor rather than a simple diode allows the reference voltage at the base to be different from the supply voltage, which allows greater flexibility in the design of the comparator, for example.

The said PTAT current generator may comprise two similar semiconductor junction devices passing different current densities. The term "similar" in this context means that the two devices are integrated together so as to be matched or else related by a known ratio of effective junction areas. The different current densities can be achieved by having different junction areas and/or different (but related) currents. It is known that the difference in $V_{BE}$ between such devices is proportional to absolute temperature. The semiconductor junction devices of the current generator may be simple diodes, or they may be bipolar transistors.

One of the two similar junction devices of the PTAT current generator may also form the first-mentioned semiconductor junction device. This feature saves space and power dissipation. This feature is particularly advantageous where it is desired to monitor the temperature at one localised part of the chip because only two devices need to be integrated at the relevant location, while the remainder of the circuit can be located elsewhere.

The PTAT current generator may comprise a further resistor formed similarly to the first mentioned resistor so that the voltage across the first mentioned resistor is substantially independent of the absolute values of the said resistors and variations therein caused by process variations or operating conditions. The resistor voltage can thus be related directly to the difference in the $V_{BE}$'s of the two similar junction devices without actual knowledge, for example, of the temperature coefficients of the resistors. If the resistors have non-zero temperature coefficients, then they should be at the same temperature, but need not be at the location whose temperature is being monitored.

The comparator may comprise first and second similar transistor arrangements each having first and second main terminals and a control terminal and each being connected by its main terminals in series with a respective one of the said semiconductor junction device and (first-mentioned) resistor, the control terminal of the second transistor arrangement being connected to the control terminal and the second main terminal of the first transistor arrangement, the said output signal of the comparator being generated at or from a signal at the second main terminal of the second transistor arrangement. Such a comparator can be simple and compact, although it will affect the currents flowing in the resistor or the junction device above or below the threshold temperature. Alternatively, a more conventional differential amplifier can be used as the comparator.

The semiconductor junction devices of the PTAT current generator, and the first mentioned semiconductor junction device if separately provided, may be integrated close to a power semiconductor device whose maximum permissible operating temperature corresponds to the threshold temperature. The circuit thus forms part of a so-called "intelligent" power chip including protection against overheating. It is an advantage in this context that the circuit in accordance with the invention is both accurate without adjustment and compatible with a wide range of integration processes. Also, and particularly if the first mentioned junction device is formed by one of the PTAT current generator devices, only a small part of the circuit needs to be located in the part of the chip whose temperature is to be sensed. The remainder of the circuit, including, for example, the resistor(s) can be located at a more convenient part of the chip.

Each said semiconductor junction device may comprise a transistor in common collector configuration having its base electrode connected to the said voltage reference source while the power device is a vertical device and has a main electrode formed by a substrate region of the integrated circuit which also forms or is connected to the collector(s) of the or each said common collector semiconductor device. This is an example of an embodiment where the temperature sensing devices can be made by the same process steps as the power device which may be, for example, a vertical MOSFET (where the drain is the substrate) or a vertical bipolar transistor (where the collector is the substrate).

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1A:
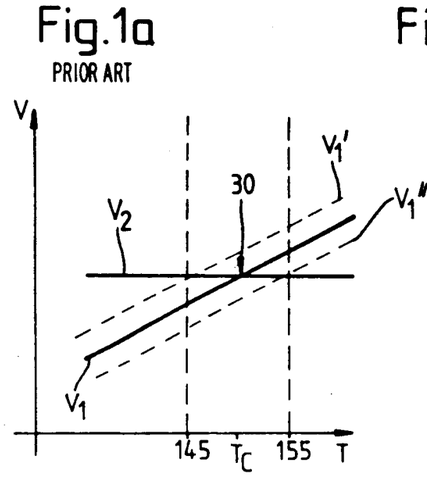
FIG. 1 shows graphs illustrating the performance of (a) a known circuit and (b) a circuit in accordance with the invention.

FIG. 1(a) illustrates the operation of a first known type of temperature sensing circuit (for example that described in DE-A1-3415764) in which a temperature dependent first signal ($V_1$) is compared with a second signal ($V_2$) which is a constant reference signal. The two signals $V_1$ and $V_2$ are plotted against temperature T (horizontal axis). A desired threshold temperature $T_c$ is marked on the T-axis, together with a permitted tolerance range for $T_c$. If it is desired to prevent a power integrated circuit chip from overheating by use of this circuit, $T_c$ might, as an example, be specified to be 150 degrees Celsius, plus or minus five degrees. In other words, the actual threshold temperature at which the output signal changes from '0' to '1' must lie within the range 145 to 155 degrees, as marked on the graph of FIG. 1(a).

In the first known type of circuit, the output signal changes state as the temperature rises above the temperature at which $V_1 = V_2$. Using the solid line $V_1$ shown on the graph, this switching temperature is clearly the desired threshold temperature $T_c$ (150 degrees), as defined by the crossover point 30. It should be noted that it is conventional to provide a hysteresis characteristic for the threshold detection. For simplicity, hysteresis will be ignored in the present description.

The solid line for $V_1$ represents the ideal situation, but in practice variations will occur in the signal $V_1$ so that the crossover does not occur at $T_c$ exactly. The permitted variation in the signal $V_1$ is marked by the upper and lower dashed lines $V_1'$ and $V_1''$, which cross the line for $V_2$ at 145 and 155 degrees respectively. Of course the second signal $V_2$ will also vary in practice but, for clarity, only variations in the first signal $V_1$ will be considered.

Figure 2:
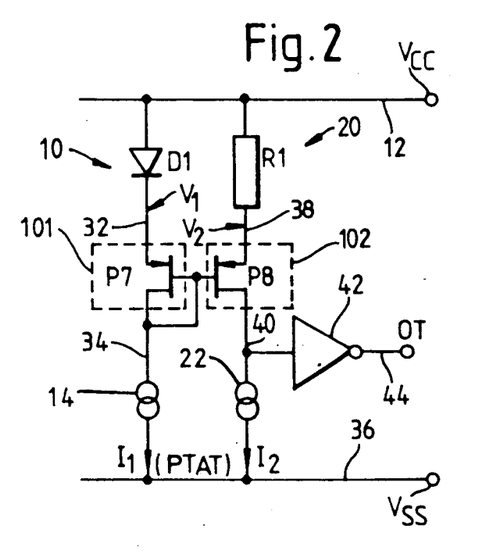
FIG. 2 shows schematically a first embodiment of the present invention.
Figure 3:
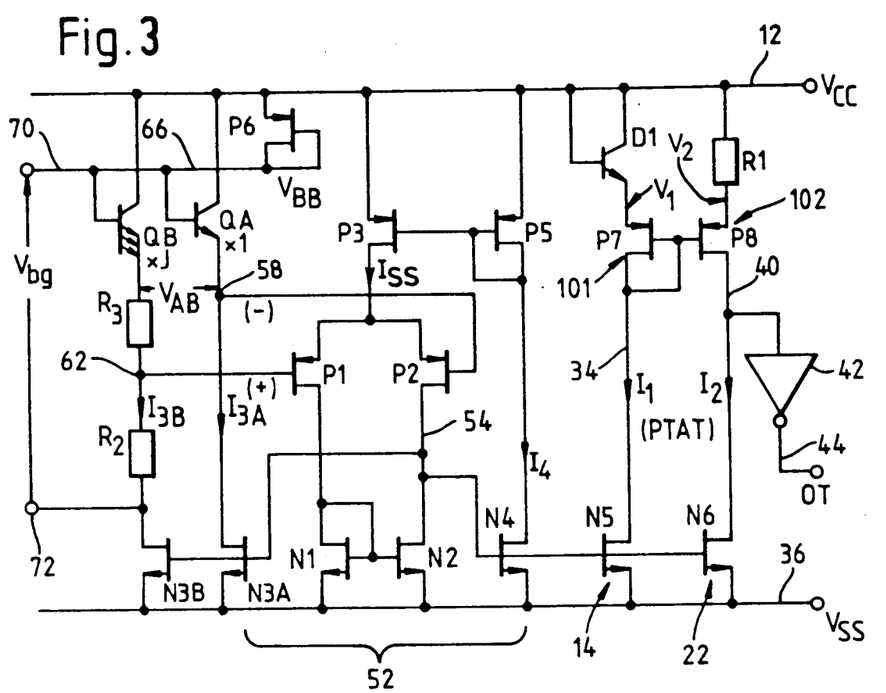
FIG. 3 shows in more detail a second embodiment of a temperature sensing circuit in accordance with the invention.
Figure 4:
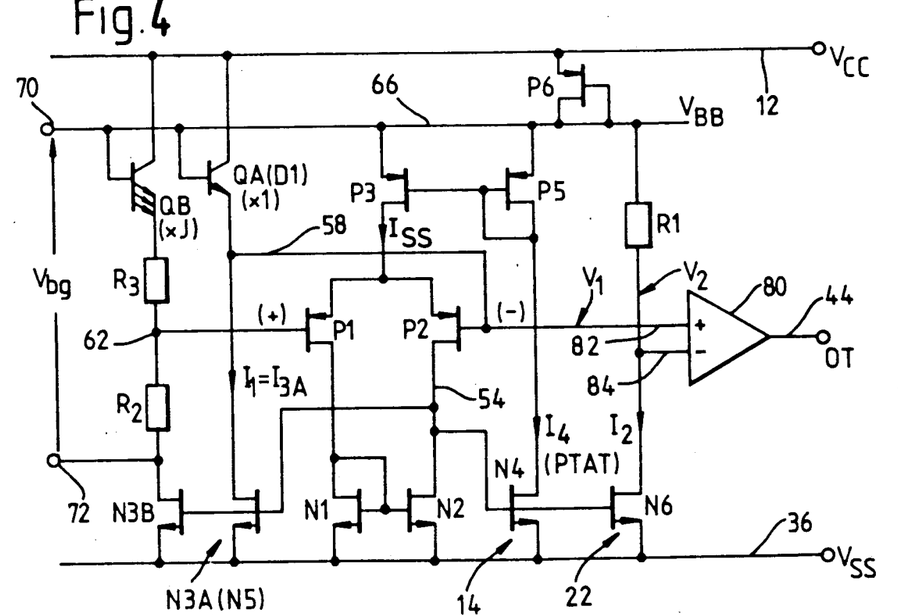
FIG. 4 shows a third embodiment of a temperature sensing circuit in accordance with the invention.

FIGS. 2 to 4 show embodiments of the invention. The reference signs used are as far as possible the same for corresponding parts of the embodiments. The embodiments to be described are all constructed mainly in CMOS technology, but could equally well be constructed in nMOS, pMOS or bipolar technology, with appropriate modifications.

FIG. 2 shows a simple circuit that includes a first temperature sensing semiconductor junction device in the form of a p-n diode D1 which has its anode connected to the positive supply rail 12 ($V_{CC}$) and its cathode connected at 32 to the source of a diode-connected p-channel transistor P7. The drain and gate of the transistor P7 are connected at 34 to a first PTAT current source 14.

An integrated resistor R1 is connected between the supply rail 12 ($V_{CC}$) and the source of a second p-channel transistor P8 (at 38). The drain of transistor P8 is connected at 40 to a second PTAT current source 22.

The gate of the p-channel transistor P8 is connected to the gate and drain of the transistor P7 so that these two transistors P7 and P8 embody respectively the first and second transistor arrangements referred to in the introduction above, and referenced 101 and 102 in FIG. 2. The source and drain of each transistor P7/P8 forms the first and second main terminals respectively of the corresponding arrangement 101/102 and the gate of each transistor P7/P8 forms the control terminal of the corresponding arrangement 101/102. The main terminals of the first transistor arrangement 101 are in series with the diode D1 and the first PTAT current source 14 while the main terminals of the second transistor arrangement 102 are in series with the resistor R1 and the second PTAT current source 22. The node 40 at the second main terminal of the second transistor arrangement 102 (drain of transistor P8) is connected to the input of an inverting buffer 42 which may, for example, be a simple CMOS inverter. The output 44 of the inverter 42 forms the output of the temperature sensing circuit and in operation carries a logic signal 0T.

Figure 1B:
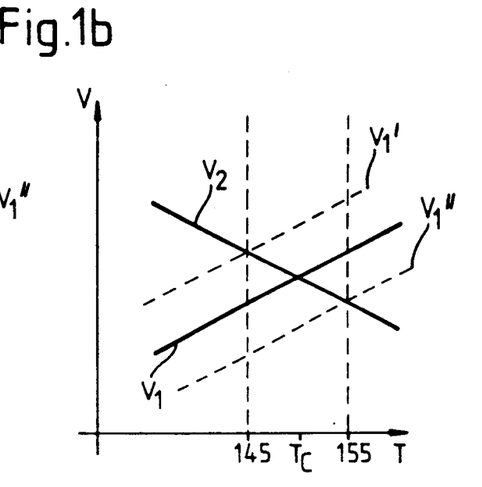

In operation, the current sources 14 and 22 draw PTAT currents $I_1$ and $I_2$ through the respective elements D1 and R1 to generate first and second voltage signals $V_1$ and $V_2$ at the first main terminals of the transistor arrangements 101 and 102 formed by the sources of the transistors P7 and P8 respectively (nodes 32 and 38). The behavior of the signals V1 and V2 in the circuit of FIG. 2 around the threshold temperature $T_c$ is shown in the graph of FIG. 1(b). While the voltage signal V1 is shown as increasing linearly with temperature, it should be noted that it will include a small component decreasing logarithmically with temperature because of the logarithmic dependence of $V_{BE}$ on the PTAT current flowing through the diode D1. The transistor arrangements 101 and 102 and the inverter 42 act as a very simple comparator in the following manner. The current $I_1$ flows unimpeded through the first transistor arrangement 101 (P7) at all times since the arrangement 101 is effectively diode-connected. However, the current through the second transistor arrangement 102 (P8) is controlled by the voltage difference between its control terminal (gate of transistor P8) and its first main terminal (source of transistor P8) so that the full second current $I_2$ can only flow when the second signal $V_2$ is higher (more positive) than or equal to the first signal $V_1$. In this state, which from FIG. 1(b) indicates a chip temperature less than $T_c$, the voltage at the input of the inverter 42 (node 40) is high and the output signal 0T is at logic '0'.

If the temperature then rises above $T_c$ the second voltage signal $V_2$ at node 38 will try to fall below the first voltage signal $V_1$ at node 32 and the second transistor arrangement 102 (P8) will become increasingly shut off. This has the effect of limiting the current $I_2$ and the voltage signal $V_2$ so that above the threshold temperature $T_c$ the graph of $V_2$ will in fact deviate from the straight line shown in FIG. 1(b). At the same time however, the voltage at the input of the inverter 42 (node 40) falls dramatically as the second transistor arrangement 102 (P8) shuts off and the second current source 22 tries to maintain the second current $I_2$, so that at temperatures above $T_c$ the output signal 0T is at logic '1', as required.

It should be appreciated that the transistor arrangements 101 and 102 are embodied by the simple transistors P7 and P8 for the purposes of this description only. By analogy with principles well known from the construction of current mirror circuits, those skilled in the art will recognize that more complex transistor arrangements could be used. For example, each arrangement 101 and 102 might comprise a plurality of transistors in so-called cascode or Darlington configurations to achieve higher gain and hence a sharper transistion from one state to the other at the threshold temperature $T_c$.

The characteristics of the diode D1 and the PTAT current will be relatively accurately known for a given integration process, and a value for the resistor R1 can be chosen to give a desired threshold temperature $T_c$. To avoid inconveniently high or low values for the resistor R1, the relative sizes of the currents $I_1$ and $I_2$ can be adjusted by scaling the relative geometries of the transistors that form the current sources 14 and 22 and of the two transistor arrangements 101 and 102 (P7/P8), in accordance with well known principles.

In the case where it is desired to monitor the temperature of an integrated circuit chip, for example, a so-called "smart-power" chip, at least the temperature-sensitive parts of the PTAT current sources 14 and 22 and the $V_{BE}$ reference diode D1 are integrated on the chip to be monitored so that they are in close thermal contact with the source of the heat. The other parts of the circuit could be on another part of the chip or even external to the chip. For simplicity it will be assumed that the whole temperature sensing circuit is integrated on the same chip. This takes full advantage of the fact that the proposed circuits can be designed to require no trimming after manufacture.

FIG. 1(b) shows the corresponding graph of $V_1$ and $V_2$ against T for the novel circuits of FIGS. 2 to 4. It can be seen that in contrast with the first known type of circuit (FIG. 1(a)), the second signal $V_2$ now has a temperature variation in the opposite direction to that of the first signal $V_1$, but the crossover (where the signal 0T changes from '0' to '1') in the ideal situation (solid lines) still occurs at the desired threshold temperature $T_c$ (150 degrees).

Again limiting our analysis to variations in $V_1$, the upper and lower limit lines $V_1'$ and $V_1''$ are marked as in FIG. 1(a) so as to cross the line of $V_2$ at 145 and 155 degrees respectively. It can be seen clearly that, thanks to the opposing temperature coefficients of the signals $V_1$ and $V_2$, the permitted deviation of the first signal $V_1$, as defined by the dashed lines $V_1'$ and $V_1''$, is far wider than in the first known type of circuit where a constant reference level is used for the second signal (FIG. 1(a)).

Thus, the oppositely varying use of signals in accordance with the present invention allows a wider tolerance on the circuit values that define the signals $V_1$ and $V_2$. This is important in a fully integrated circuit since process variations cannot be eliminated entirely and with wider tolerances the yield of good circuits will be higher.

It may be noted that a second known type of circuit described in U.S. Pat. No. 4,733,162 also embodies the principle of comparing a PTAT voltage with $V_{BE}$ to obtain a sensitive temperature threshold detection. However, for the reasons set forth in the introductory part of this specification, circuits constructed in accordance with the present invention produce improved definition of the threshold temperature. It may also be noted that in the circuits of U.S. Pat. No. 4,733,162 a constant current source (33) plays a role in defining the threshold temperature, but that no practical means are disclosed in U.S. Pat. No. 4,733,162 for defining the constant current ($I_{33}$) generated by the source (33). In contrast, those skilled in the art will recognise that the detailed embodiments of the present invention described below with reference to FIGS. 3 and 4 are entirely self-contained and enable $T_c$ to be predicted in terms of circuit parameters that are relatively well-defined in a typical integration process.

FIG. 3 shows an embodiment of the invention which is similar to the schematic embodiment (FIG. 2) except that a differential amplifier 52 is shown which serves to generate the first and second PTAT currents $I_1$ and $I_2$. Various PTAT current sources are known from the prior art, and that to be described represents just one possible arrangement.

The differential amplifier 52 comprises two p-channel (enhancement mode) transistors P1 and P2 in a long-tailed pair configuration, with their common source current $I_{SS}$ being supplied from the supply rail 12 ($V_{CC}$) via a further p-channel transistor P3. The drains of the p-channel pair P1, P2 are connected to the other supply rail 36 ($V_{SS}$) via an n-channel current mirror active load formed by a diode-connected transistor N1 and a transistor N2, respectively. Two n-channel transistors N3A and N3B have their gates connected to the junction 54 of the drains of the transistors P2 and N2, and form first and second output transistors of the differential amplifier 52, respectively.

The drain of the first output transistor N3A is connected at a node 58 to the emitter of a first integrated n-p-n bipolar transistor QA, whose collector is connected to the supply rail 12 ($V_{CC}$). The drain of the second output transistor N3B is connected via a resistor R2 to a node 62. The node 62 is in turn connected via a further resistor R3 to the emitter of a second integrated n-p-n bipolar transistor QB whose collector is also connected to the supply rail 12 ($V_{CC}$). The second bipolar transistor QB has an effective emitter area which is a known factor J times larger than that of the first bipolar transistor QA.

The bipolar transistors QA (x1) and QB (xJ) both have their bases connected to a bias rail 66, which is connected via a diode-connected p-channel MOS transistor P6 to the supply rail 12 ($V_{CC}$). The node 58 (emitter of bipolar transistor QA and drain of output transistor N3A) is connected to the gate of transistor P2 which forms the inverting input (−) of the differential amplifier 52. The node 62 (junction of resistors R2 and R3) is connected to the gate of transistor P1 which forms the non-inverting input (+) of the amplifier 52.

In operation, the diode connected p-channel transistor P6 serves to hold the bias rail 66 at a voltage $V_{BB}$ which is just a few volts below $V_{CC}$. This provides enough "headroom" for the operation of the differential amplifier 52. The output transistors N3A and N3B of the differential amplifier 52 draw currents $I_{3A}$ and $I_{3B}$ through the first and second bipolar transistors QA (x1) and QB (xJ) respectively.

If the output transistors N3A and N3B are matched, then the currents $I_{3A}$ and $I_{3B}$ must be equal. Therefore the current density in the first bipolar transistor QA (x1) is J times larger than that in the second bipolar transistor QB (xJ). It can therefore be predicted that there will be a difference $V_{AB}$ between the base-emitter voltage drops across the two bipolar transistors QA and QB, given by the equation:

$$V_{AB} = \frac{kT}{q} \ln (J).$$

where k is Boltzmann's constant ($1.38 \times 10^{-23}$ joule.kelvin$^{-1}$), T is absolute temperature in kelvin, q is the electronic charge ($1.6 \times 10^{-19}$ coulomb) and ln(J) is the natural logarithm of the factor J. It is clear that $V_{AB}$ is a voltage proportional to the absolute temperature, T.

Since the bases of the bipolar transistors QA and QB are both connected to the bias rail 66 ($V_{BB}$), the PTAT voltage difference $V_{AB}$ appears between their emitters, as shown. At the same time, the feedback from the output transistors N3A and N3B to the inputs (−) and (+) of the differential amplifier 52 ensures that the voltages at the nodes 58 (−) and 62 (+) are equal. This in turn means that the PTAT voltage signal $V_{AB}$ is impressed across the resistor R3, so that the current $I_{3B}$ is also proportional to absolute temperature (PTAT):

$$I_{3B} = V_{AB}/R3.$$

A third n-channel output transistor N4 also has its gate connected to the same node 54 as that of the first and second output transistors N3A and N3B, and therefore generates a current $I_4$ proportional to $I_{3A}$ and $I_{3B}$. This current $I_4$ is fed to the diode-connected input transistor P5 of a p-channel current mirror whose output transistor P3 supplies the bias current $I_{SS}$ for the differential amplifier 52. With appropriate scaling of the geometries of the transistors N3A, N3B, N4, P5 and P3, this feedback biasing arrangement can eliminate the systematic offset errors which would otherwise occur when the differential amplifier 52 drives a non-infinite impedance load as it does in the present circuit. This biasing technique is described in detail in a co-pending United Kingdom Patent Application No. 8820836.8 (PHB 33483) which corresponds to U.S. application No. 398,017 (8/24/89). That application also describes an arrangement which may be necessary for avoiding undesirable latch-up conditions, but is not shown in FIG. 3 for the sake of clarity.

The node 54 is also connected to the gates of fourth and fifth output transistors N5 and N6, respectively. The main current path of the transistor N5 is connected in series with the diode D1 and the diode-connected first transistor arrangement 101 (transistor P7) and thus forms the first current source 14, to supply the first current $I_1$. The main current path of the transistor N6 is connected in series with the resistor R1 and the second transistor arrangement 102 (transistor P8) so as to form the second current source 22 for supplying the second current $I_2$. The currents $I_1$ and $I_2$ flowing through the diode D1 and the resistor R1 are thus PTAT reference currents since they are related to the PTAT currents $I_{3A}$ and $I_{3B}$ flowing in the output transistors N3A and N3B by the well known current mirror principle. The currents $I_1$ and $I_2$ can be adjusted together by suitable choice of the resistor R3, while their relative values can be adjusted by adjusting the relative geometries of the transistors N5 and N6.

The PTAT variation in the first current $I_1$ does not produce a substantial variation in the first signal $V_1$ because of the non-linear nature of the diode-connected transistor D1. However, the PTAT variation of the second current $I_2$ produces a well-defined downward variation in the second signal $V_2$ as T increases, which again improves sensitivity over the known circuit. This variation is in addition to any variation caused by the temperature coefficient of the resistor R1 which may also be used to increase the sensitivity of the circuit. Where the temperature coefficient of the resistor R1 is ill-defined and so cannot be relied upon in defining the threshold temperature, it can be compensated for automatically if the resistor R3 is integrated by the same process as the resistor R1. In that case the resistors R1 and R3 will track each other with temperature (and with process variations) and, since R3 is used to define the PTAT currents $I_1$ and $I_2$, any variation in $V_2$ that would be caused by a variation in the value of the resistor R1 will be cancelled by a corresponding variation in the currents $I_1$ and $I_2$ caused by a corresponding variation in the value of the resistor R3.

The arrangement shown for generating the PTAT currents $I_1$ and $I_2$ can also be used as a source of an accurate "bandgap" reference voltage $V_{bg}$ if the values of the resistors R2 and R3 are in the correct proportions, in accordance with known principles. Therefore, in FIG. 3, two output terminals 70 and 72 are shown connected to the bias rail 66 ($V_{BB}$) and the drain of the transistor N3B, respectively, so that the bandgap reference voltage $V_{bg}$ can be used by external circuits.

FIG. 4 shows a further embodiment of a temperature sensing circuit in accordance with the invention. This embodiment is similar to that of FIG. 3, but the diode D1 and fourth output transistor N5 of the differential amplifier 52 are not provided separately. Instead, the first bipolar transistor QA is also used as the first temperature sensing junction device (D1), providing a more compact embodiment.

Also, the simple comparator means formed by the transistor arrangements 101 and 102 (P7, P8) is not used in this embodiment. Instead, the resistor R1 is connected directly between the bias rail 66 ($V_{BB}$) and the second current source 22 (drain of transistor N6). The differential signal $V_1-V_2$ is sensed by a more conventional voltage comparator 80 having a non-inverting input 82 connected to the node 58 (emitter of bipolar transistor QA and drain of transistor N3A) and an inverting input 84 connected to the junction of the resistor R1 and the drain of the fifth output transistor N6 (second current source). The output of the comparator 80 forms the output 44 (OT) of the temperature sensing circuit. As with the previous embodiment, with a suitable choice of values for resistors R2 and R3, this circuit provides a bandgap reference voltage $V_{bg}$ across the terminals 70 and 72.

The embodiment of FIG. 4 may be advantageous since it reduces the number of temperature sensing components which all need to be integrated at the same part of the chip whose temperature is to be sensed. This is important since, in a practical application, it may be necessary to integrate the temperature sensing components D1, QA and QB very close to, or even in the middle of a power semiconductor device, in order to allow timely detection of high temperature transients. If the resistors R1 and R3 are made to track and thus play no part in the temperature sensing, and if the circuit of FIG. 4 is used, then only the two bipolar transistors QA and QB need to be provided on the relevant part of the chip, simplifying construction considerably.

It will be appreciated that whereas the embodiments described herein contain MOS transistors of particular conductivity types, the inventive principle can equally be applied to circuits in which devices have the opposite conductivity type and signals have the opposite polarity, and to circuits using bipolar devices. It will also be appreciated that where a particular form of circuit has been shown for performing a function which is well-known per se (for example, a differential amplifier or a current mirror), there may be many other circuits for performing the same function which can be used in place of those described. Hysteresis may also be provided by means of feedback as is well-known in the art.

Furthermore, it will be appreciated that where a single diode or bipolar transistor has been described as a temperature sensing element, it is possible to enhance sensitivity by using a plurality of diodes (transistors) in cascade, or by using resistors to create a so-called "$V_{BE}$ multiplier" arrangement around a single bipolar transistor. An example of a cascade of transistors used to magnify $V_{BE}$ is described in "A CMOS bandgap reference with reduced offset sensitivity" by G. Holle, ESSCIRC '88, pages 207–210.

From reading the present disclosure, other modifications will be apparent to persons skilled in the art. Such modifications may involve other features which are already known in the design, manufacture and use of temperature sensing circuits and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any modifications thereof, whether or not it relates to the same invention as presently claimed in any claim and whether or not it mitigates any or all of the same technical problems as does the present invention.

We claim:

1. A temperature threshold sensing circuit for an integrated circuit comprising:
    a semiconductor junction device providing a $V_{BE}$ reference,
    a proportional-to-absolute-temperature (PTAT) current generator comprising;
    a resistor and a PTAT current source connected in a first series circuit to terminals of a source of supply voltage, and
    a further PTAT current source connected in a second series circuit with the semiconductor junction device to said terminals of the supply voltage source, and wherein said temperature threshold sensing circuit further comprises;
    means coupled to said resistor and to said semiconductor junction device for detecting whether a voltage developed across the resistor exceeds the $V_{BE}$ reference and for generating an output signal which thereby indicates whether the temperature of the integrated circuit is above or below a predetermined threshold temperature, and wherein the detecting means comprise a voltage comparator for comparing voltage drops across the resistor and the semiconductor junction device.

2. A circuit as claimed in claim 1 wherein said semiconductor junction device comprises a bipolar transistor connected in common collector configuration and having its base terminal connected to a reference voltage source and its emitter connected to one input of the voltage comparator, and wherein the resistor is connected between said reference voltage source and another input of the comparator.

3. A circuit as claimed in claim 1 wherein said PTAT current generator comprises two similar semiconductor junction devices passing different current densities.

4. A circuit as claimed in claim 3 wherein one of the two similar semiconductor junction devices of the PTAT current generator also comprises said semiconductor junction device.

5. A circuit as claimed in claim 2, wherein the PTAT current generator comprises a further resistor formed similarly to the first resistor so that the voltage across the first resistor is substantially independent of the absolute values of said resistors and variations therein caused by process variations or operating conditions.

6. A circuit as claimed in claim 1 wherein the comparator comprises first and second similar transistor arrangements each having first and second main terminals and a control terminal and with the main terminals of the first transistor arrangement connected in series with said semiconductor junction device and the second transistor arrangement having its main terminals connected in series with said resistor, the control terminal of the second transistor arrangement being connected to the control terminal and the second main terminal of the first transistor arrangement, said output signal of the comparator being generated from a signal at the second main terminal of the second transistor arrangement.

7. A circuit as claimed in claim 3, wherein the two semiconductor junction devices of the PTAT current generator are integrated in close thermal relationship to an integrated power semiconductor device whose maximum permissible operating temperature corresponds to the threshold temperature.

8. A circuit as claimed in claim 7 wherein each said semiconductor junction device comprises a transistor in common collector configuration having its base electrode connected to a voltage reference source and the power semiconductor device is a vertical device and has a main electrode formed by a substrate region of the integrated circuit which also forms or is connected to the collector of the common collector semiconductor device or the collector of each said common collector semiconductor device.

9. A circuit as claimed in claim 2 wherein said PTAT current generator comprises two similar semiconductor junction devices passing different current densities.

10. A circuit as claimed in claim 9 wherein one of the two similar semiconductor junction devices of the PTAT current generator also comprises said bipolar transistor junction device.

11. A circuit as claimed in claim 3, wherein the PTAT current generator comprises a further resistor in the integrated circuit similar to the first resistor so that the voltage across the first resistor is substantially independent of the absolute resistance values of said resistors and variations therein caused by process variations or operating conditions.

12. A circuit as claimed in claim 2 wherein the comparator comprises first and second similar transistor arrangements each having first and second main terminals and a control terminal and with the main terminals of the first transistor arrangement connected in series with said semiconductor junction device and the second transistor arrangement having its main terminals connected in series with said resistor, the control terminal of the second transistor arrangement being connected to the control terminal and the second main terminal of the first transistor arrangement, said output signal of the comparator being generated from a signal at the second main terminal of the second transistor arrangement.

13. A circuit as claimed in claim 1 wherein said PTAT current generator further comprises;
   first and second transistors connected as a differential transistor pair having a common terminal, first and second control input terminals and first and second output terminals,
   a current mirror circuit coupled to said first and second output terminals of the differential transistor pair,
   a pair of first and second output transistors each having a control electrode coupled to said second output terminal of the differential transistor pair,
   second and third semiconductor junction devices adapted to pass currents of different density and connected in respective series circuits with said first and second output transistors to said terminals of the voltage supply source,
   a feedback coupling between respective junction points in said respective series circuits and respective ones of said first and second control inputs of the differential transistor pair,
   a bias current source for supplying to said common terminal a current related to currents in said pair of output transistors, and wherein
   said PTAT current source and said further PTAT current source include third and fourth transistors having control electrodes coupled to said second output terminal of the differential transistor pair and with said third and fourth transistors connected in series with said resistor and the first semiconductor junction device in said first and second series circuits, respectively.

14. A circuit as claimed in claim 1 further comprising second and third semiconductor junction devices coupled to said terminals of the voltage supply source so as to pass currents of different current density and further coupled to said first and second series circuits in a manner such that the currents in said first and second series circuits are related to the currents passed by the second and third semiconductor junction devices.

15. A circuit as claimed in claim 14 wherein the first semiconductor junction device comprises a bipolar transistor connected in common collector configuration and having its base terminal connected to a reference voltage source and its emitter connected to one input of the voltage comparator, and wherein the resistor is connected between said reference voltage source and another input of the comparator.

16. A circuit as claimed in claim 14 further comprising a second resistor connected in a series circuit with one of said second and third semiconductor junction devices, and wherein said first and second resistors are each a part of said integrated circuit such that a voltage produced across the first resistor is substantially independent of the absolute values of resistance of said first and second resistors and of resistance variations caused by operating conditions of the integrated circuit.

17. A circuit as claimed in claim in 14 wherein the integrated circuit includes a power semiconductor device whose temperature is to be monitored and said second and third semiconductor junction devices are integrated in said integrated circuit in close thermal coupling relationship to the power semiconductor device.

18. A circuit as claimed in claim 17 wherein at least said second and third semiconductor junction devices each comprise a transistor connected in common collector configuration and with each base electrode thereof coupled to a source of reference voltage.

19. A circuit as claimed in claim 1 further comprising a second semiconductor junction device having a different current density than the first semiconductor junction device and coupled to the terminals of said voltage supply source, and wherein,
   said voltage comparator includes first and second inputs coupled to said resistor and to the first semiconductor junction device, respectively.

20. A temperature sensing circuit for an integrated circuit chip comprising:
   a resistor and a proportional-to-absolute-temperature (PTAT) current source connected in a first series circuit to terminals of a source of supply voltage,
   a semiconductor junction device integrated on the chip to provide a $V_{BE}$ reference,
   a further PTAT current source connected in a second series circuit with the semiconductor junction device to said terminals of the supply voltage source thereby to generate a first voltage having a given variation with temperature,
   said first series circuit generating a second voltage having a given inverse temperature variation relative to the temperature variation of said first generated voltage, and
   a voltage comparator which receives and compares said first and second voltages to derive an output signal which is determined by the temperature of the chip.

21. A temperature sensing circuit as claimed in claim 20 wherein said semiconductor junction device comprises a bipolar transistor connected in common collector configuration and with a control electrode coupled to a source of fixed reference voltage.

22. A temperature sensing circuit as claimed in claim 21 wherein said bipolar transistor has a first main electrode coupled to a terminal of the voltage supply source.

* * * * *

UNITED STATES PATENT AND TRADEMARK OFFICE
CERTIFICATE OF CORRECTION

PATENT NO. : 5,039,878
DATED : August 13, 1991
INVENTOR(S) : DESMOND R. ARMSTRONG ET AL It is certified that error appears in the above-identified patent and that said Letters Patent is hereby corrected as shown below:

In Column 11:

Claim 10, line 4, delete "junction device".

Claim 11, line 2, after "resistor" insert --formed--.

Signed and Sealed this

Twelfth Day of October, 1993

BRUCE LEHMAN

Attest:

Attesting Officer

Commissioner of Patents and Trademarks